(12) United States Patent
Zhang et al.

(10) Patent No.: US 11,646,822 B2
(45) Date of Patent: May 9, 2023

(54) GROUPCAST TRANSMISSION WITH FEEDBACK FOR INTRA-PLATOONING AND INTER-PLATOONING COMMUNICATIONS

(71) Applicant: Apple Inc., Cupertino, CA (US)

(72) Inventors: Wei Zhang, Santa Clara, CA (US); Wanping Zhang, San Jose, CA (US); Fangli Xu, Beijing (CN); Haitong Sun, Irvine, CA (US); Pengkai Zhao, San Jose, CA (US); Jia Tang, San Jose, CA (US); Wei Zeng, San Diego, CA (US); Yuqin Chen, Shenzhen (CN); Haijing Hu, Beijing (CN); Sami M. Almalfouh, San Jose, CA (US); Dawei Zhang, Saratoga, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 16/582,081

(22) Filed: Sep. 25, 2019

(65) Prior Publication Data
US 2020/0186290 A1 Jun. 11, 2020

Related U.S. Application Data

(60) Provisional application No. 62/778,181, filed on Dec. 11, 2018.

(51) Int. Cl.
*H04L 1/00* (2006.01)
*H04L 5/00* (2006.01)
(Continued)

(52) U.S. Cl.
CPC .......... *H04L 1/0073* (2013.01); *H04L 1/0026* (2013.01); *H04L 1/0031* (2013.01);
(Continued)

(58) Field of Classification Search
CPC ... H04L 1/0073; H04L 1/0026; H04L 5/0055; H04L 1/0061; H04L 1/0031;
(Continued)

(56) References Cited

U.S. PATENT DOCUMENTS

| 9,648,500 B2 | 5/2017 | Chen |
| 10,187,180 B2 | 1/2019 | Sorrentino |

(Continued)

FOREIGN PATENT DOCUMENTS

WO  2019012041 A1  1/2019

OTHER PUBLICATIONS

Yoon, et al.; "COTA: Channel Occupancy Time Adaptation for LTE in Unlicensed Spectrum"; 2017 IEEE International Symposium on Dynamic Spectrum Access Networks (DySpan); Mar. 6-9, 2017; ten pages.

(Continued)

*Primary Examiner* — Sharmin Chowdhury
(74) *Attorney, Agent, or Firm* — Kowert, Hood, Munyon, Rankin & Goetzel, P.C.

(57) ABSTRACT

Groupcast communications between devices of a group of devices, e.g. between vehicles in a platoon, may include a device in the group transmitting a groupcast message in a sidelink transmission to the other devices and receiving feedback information in sidelink transmissions from the other devices within the same channel occupancy time (CoT). The feedback information may be transmitted by the other devices in response to the groupcast message including an information request directed to the other devices. The group of devices may include a designated group leader which may manage one or more aspects of the communications of the other devices in the group. The designated group leader may be dynamically switched based at least on the received feedback information. The devices in the group (Continued)

may use beamforming for intra-group and inter-group side-link communications for efficient spectrum usage.

20 Claims, 7 Drawing Sheets

(51) Int. Cl.
*H04W 72/12* (2009.01)
*H04W 72/121* (2023.01)

(52) U.S. Cl.
CPC .......... *H04L 1/0061* (2013.01); *H04L 5/0055* (2013.01); *H04W 72/121* (2013.01); *H04L 2001/0092* (2013.01)

(58) Field of Classification Search
CPC .......... H04L 2001/0092; H04L 5/0091; H04L 5/0053; H04W 72/121; H04W 4/44; H04W 4/46; H04W 76/40; H04W 4/06; Y02D 30/70
See application file for complete search history.

(56) References Cited

U.S. PATENT DOCUMENTS

| | | |
|---|---|---|
| 2016/0073366 A1 | 3/2016 | Ng |
| 2016/0135143 A1 | 5/2016 | Won |
| 2017/0347394 A1* | 11/2017 | Yasukawa ............. H04L 1/1896 |
| 2018/0176955 A1 | 6/2018 | Salem |
| 2019/0013982 A1 | 1/2019 | Sun |
| 2019/0044667 A1 | 2/2019 | Guo |
| 2019/0058986 A1 | 2/2019 | Loehr |
| 2019/0141566 A1 | 5/2019 | Hong |
| 2019/0199413 A1 | 6/2019 | Sundararajan |
| 2020/0028657 A1* | 1/2020 | Bharadwaj ............ H04L 1/0026 |
| 2020/0037343 A1* | 1/2020 | He ......................... H04W 4/40 |
| 2020/0106500 A1* | 4/2020 | Noh ..................... H04L 5/0082 |
| 2020/0120458 A1* | 4/2020 | Aldana ................. H04W 28/22 |
| 2020/0221423 A1* | 7/2020 | Wang ................... H04B 17/318 |
| 2020/0305176 A1* | 9/2020 | Hu ........................ H04L 1/0003 |
| 2021/0127413 A1* | 4/2021 | Lu ....................... H04W 72/044 |
| 2021/0219268 A1* | 7/2021 | Li ............................. H04L 1/08 |
| 2022/0007403 A1* | 1/2022 | Li ..................... H04W 72/1289 |

OTHER PUBLICATIONS

Nardini, et al.; "Cellular-V2X Communications for Platooning: Design and Evaluation"; Sensors; Basel, Switzerland; May 11, 2018; 22 pages.

Mathworks; "Release 14 V2X Sidelink PSCCH and PSSCH Throughput"; Nov. 9, 2018; 13 pages.

Telecomhall; "What is Retransmission, ARQ and HARQ?"; Jun. 22, 2012; nine pages.

* cited by examiner

GROUPCAST TRANSMISSION WITH FEEDBACK FOR INTRA-PLATOONING AND INTER-PLATOONING COMMUNICATIONS

PRIORITY CLAIM

This application claims benefit of priority of U.S. Provisional Patent Application Ser. No. 62/778,181 titled "Groupcast Transmission with Feedback for Intra-Platooning and Inter-Platooning Communications", filed on Dec. 11, 2018, which is hereby incorporated by reference as though fully and completely set forth herein.

FIELD OF THE INVENTION

The present application relates to wireless communications, and more particularly to the development of groupcast transmission with feedback for intra-platooning and inter-platooning communications, e.g. V2X (vehicle-to-everything) wireless cellular communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH', etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. One proposed use of cellular communications is in vehicular applications, particularly in V2X (vehicle-to-everything) communications. V2X systems allow for communication between vehicles (e.g., communications devices housed in or otherwise carried by vehicles), pedestrian UEs (including UEs carried by cyclists), etc., in order to coordinate traffic activity, facilitate autonomous driving, and perform collision avoidance, among other purposes. The ever increasing number of features and functionality introduced in wireless communication devices, e.g. in V2X communications, creates a continuous need for improvement in both wireless communications and in wireless communication devices. In particular, it is important to ensure the accuracy of transmitted and received signals. The UEs, which may be mobile telephones or smart phones, portable gaming devices, communication systems/devices housed in or otherwise carried by transportation vehicles (e.g. cars, buses, trains, trucks, motorcycles, etc.), laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, 5G-NR, Wi-Fi, BLUETOOTH', etc.). There are ongoing efforts to achieve efficient use of wireless communication resources and thereby increase system and device operation efficiency.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to perform groupcast transmission with feedback for intra-platooning and inter-platooning communications, e.g. V2X (vehicle-to-everything) wireless cellular communications such as 3GPP LTE V2X and/or 5G-NR V2X communications. Embodiments are further presented herein for wireless communication systems containing wireless communication devices (UEs) and/or base stations and access points (APs) communicating with each other within the wireless communication systems.

Pursuant to the above, improved communications between devices in a group, e.g. improved sidelink communications between vehicles in a platoon (intra-platoon) and between vehicles in different platoons (inter-platoon) may include a first device from a group of devices transmitting a groupcast message in a sidelink transmission to other devices of the group of devices during a channel occupancy time (CoT), and receiving, in respective sidelink transmissions from one or more of the other devices, feedback information during the CoT. The first device may then conduct future groupcast transmissions based at least on the received feedback information. In some embodiments, the first device may transmit, to the group of devices prior to receiving the feedback information, additional one or more groupcast messages in respective sidelink transmissions, and/or control state information. The groupcast message may include redundancy versions, and the feedback information may include an acknowledgment message (ACK) or a non-acknowledgment message (NACK), an indication of whether a packet in the groupcast message has been correctly received, an indication of after which of a plurality of redundancy versions included in the packet an error check was successful, and/or a respective channel quality indicator (CQI) for each channel state information reference symbol transmitted by the first device.

Inclusion of the ACK, NACK, error check indication, and CQI in the feedback information may be prioritized, determining what is included in the feedback information for immediate feedback and what is scheduled for later inclusion in future feedback information. The first device may simultaneously receive respective portions of the feedback information during the CoT in respective sidelink transmissions from two or more of the other devices. Based at least on the received feedback information, the first device may adjust characteristics of future groupcast messages, divide the group of devices into sub-groups for transmission efficiency, isolate one or more of the other devices for unicast transmission, and/or may adjust an uplink/downlink format of future CoTs. In some embodiments the first device and the other devices may be part of vehicles or otherwise carried by the vehicles, where the group is a platoon. In some embodiments, the groupcast message transmitted by the first device includes an information request directed to the other devices, and the feedback information is received in response to transmitting the information request.

In some embodiments, one of the devices in the group may be designated as a group leader. The group leader may assign devices of the other devices to compete for a resource representing the group of devices. The group leader may also divide a future CoT available for the group into respective time periods for each of the other devices to transmit its own groupcast message while remaining devices of the group of devices are listening. A new group leader may be dynamically assigned/switched to in response to one or more conditions being met, for example when radio frequency channel conditions between the first device and the other devices do not meet specified requirements. The group leader may receive a periodic update from each of the other devices, with the periodic update including channel quality information associated with the other devices, and may designate one of the other devices as the group leader in response to receiving the periodic update. In some embodiments, the group leader may schedule a future CoT as a measurement CoT during which each device in the group of devices receives channel state information and channel quality information.

In some embodiments, a device of a group of devices, for example a vehicle in a platoon, may transmit a groupcast message in a sidelink transmission to targeted devices (e.g. vehicles) of the group of devices, with the message using beamforming directed from the device toward a location of the targeted devices. In some embodiments, a device of a group of devices, for example a vehicle in a platoon, may transmit a groupcast message in a sidelink transmission to targeted devices (e.g. vehicles) of another group of devices (e.g. another platoon), with the message using beamforming directed from the device toward a location of the targeted devices.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
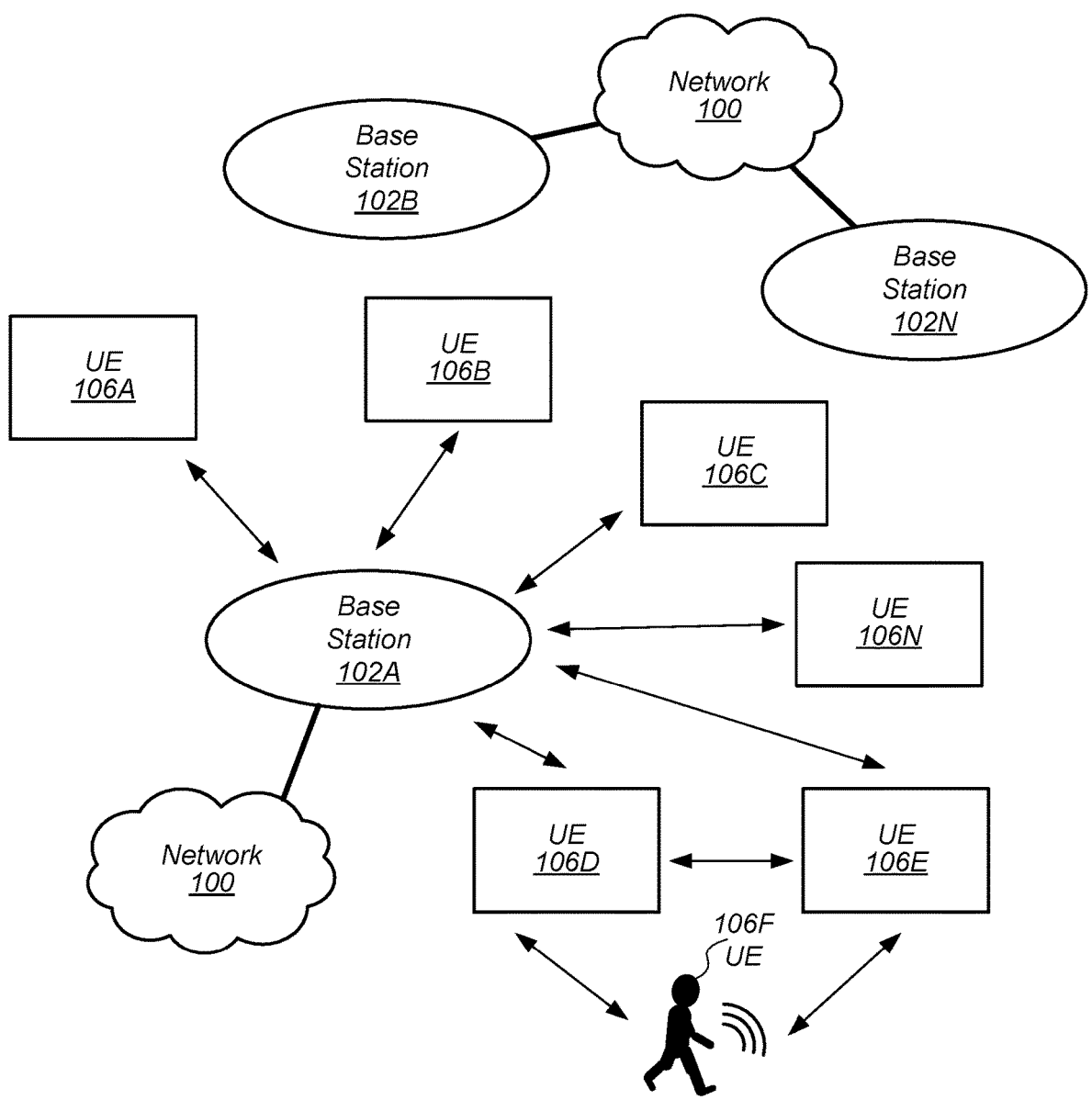
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby
DYN: Dynamic
EDCF: Enhanced Distributed Coordination Function
FDD: Frequency Division Duplexing
FDM: Frequency Division Multiplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk LQM: Link Quality Metric
LTE: Long Term Evolution
MNO: Mobile Network Operator
NAS: Non-Access Stratum
NB: Narrowband
ooS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PSCCH: Physical Sidelink Control Channel
PT: Payload Type
QBSS: Quality of Service Enhanced Basic Service Set
QI: Quality Indicator
RAN: Radio Access Network
RAT: Radio Access Technology
RF: Radio Frequency
ROHC: Robust Header Compression
RRC: Radio Resource Control
RTP: Real-time Transport Protocol
RTT: Round Trip Time
RV: Redundancy Version
RX: Reception/Receive
SAS: Spectrum Allocation Server
SI: System Information
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TDM: Time Division Multiplexing
TX: Transmission/Transmit
UE: User Equipment
UI: User Interface
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIGS. 1 and 2—Exemplary Communication Systems FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may perform groupcast transmissions with feedback for intra-platooning and inter-platooning communications, e.g. V2X (vehicle-to-everything) wireless cellular communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station(s) 102 are implemented in the context of LTE, they may alternately be referred to as an 'eNodeB' or 'eNB'. Note that if the base station 102A is implemented in the context of 5G NR, it may alternately be referred to as 'gNodeB' or 'gNB'. In some embodiments, the base station(s) 102 may communicate with UEs that perform groupcast transmission with feedback for intra-platooning and inter-platooning communications, e.g. V2X (vehicle-to-everything) wireless cellular communications, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station(s) 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V 14.3.0, among others.

Figure 2:
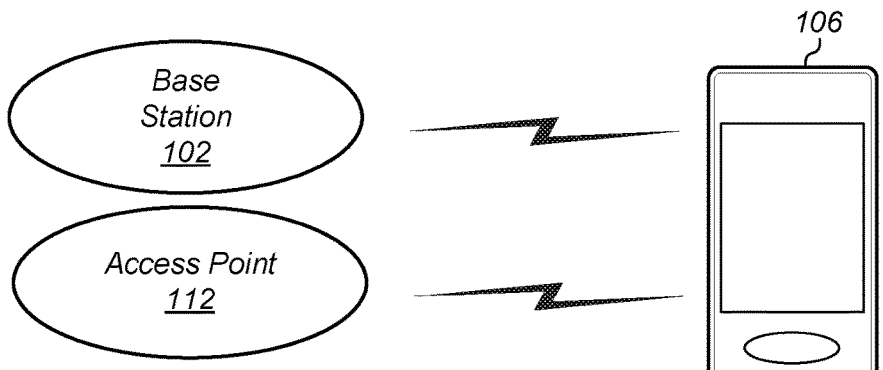
FIG. 2 illustrates an exemplary base station in communication with an exemplary wireless user equipment (UE) device, according to some embodiments.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
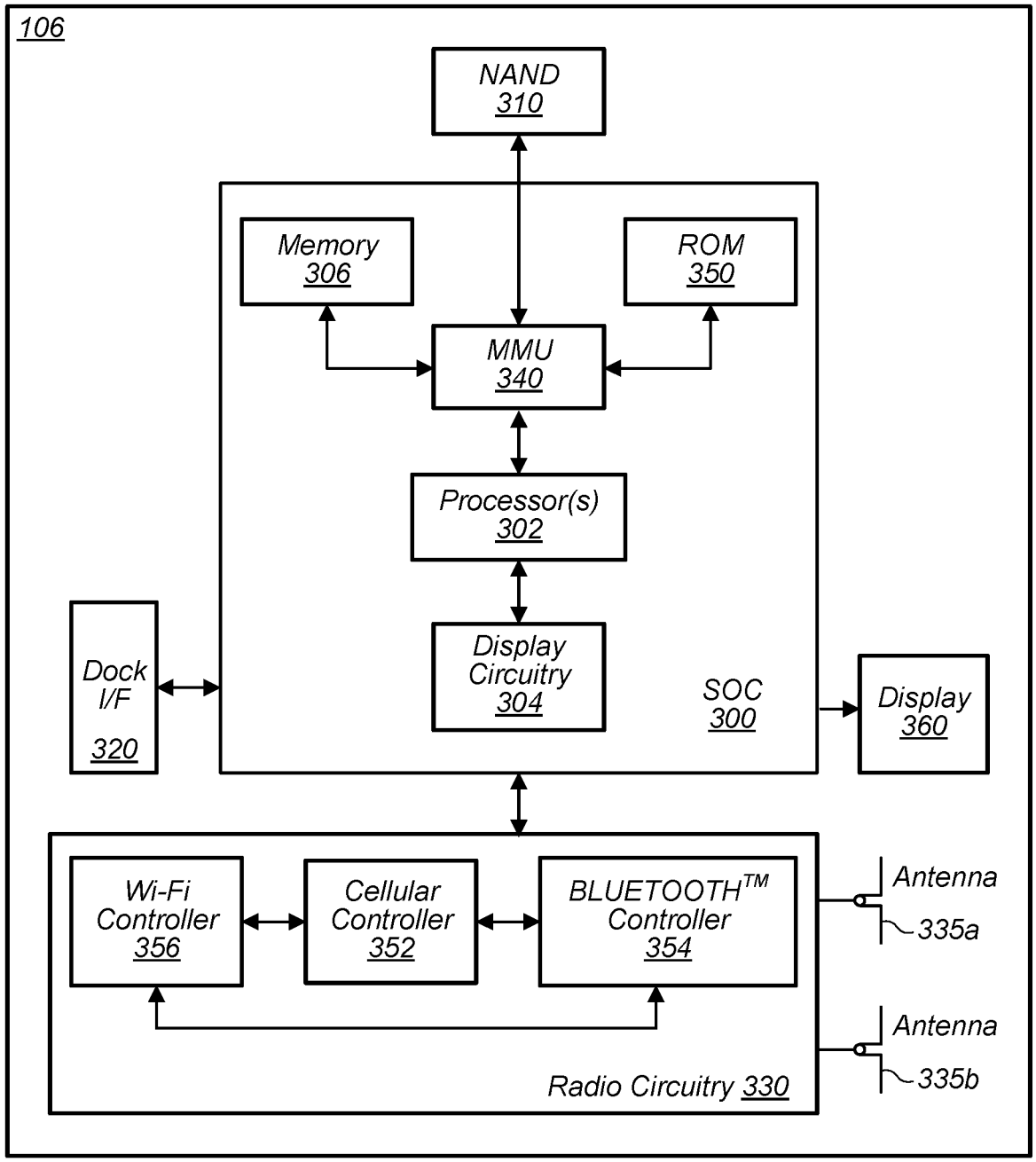
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to perform groupcast transmission with feedback for intra-platooning and inter-platooning communications, e.g. V2X (vehicle-to-everything) wireless cellular communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform groupcast transmission with feedback for intra-platooning and inter-platooning communications, e.g. V2X (vehicle-to-everything) wireless cellular communications, according to various embodiments disclosed herein. Processor(s) 302 may also implement various other applications and/or end-user applications running on UE 106.

Figure 5:
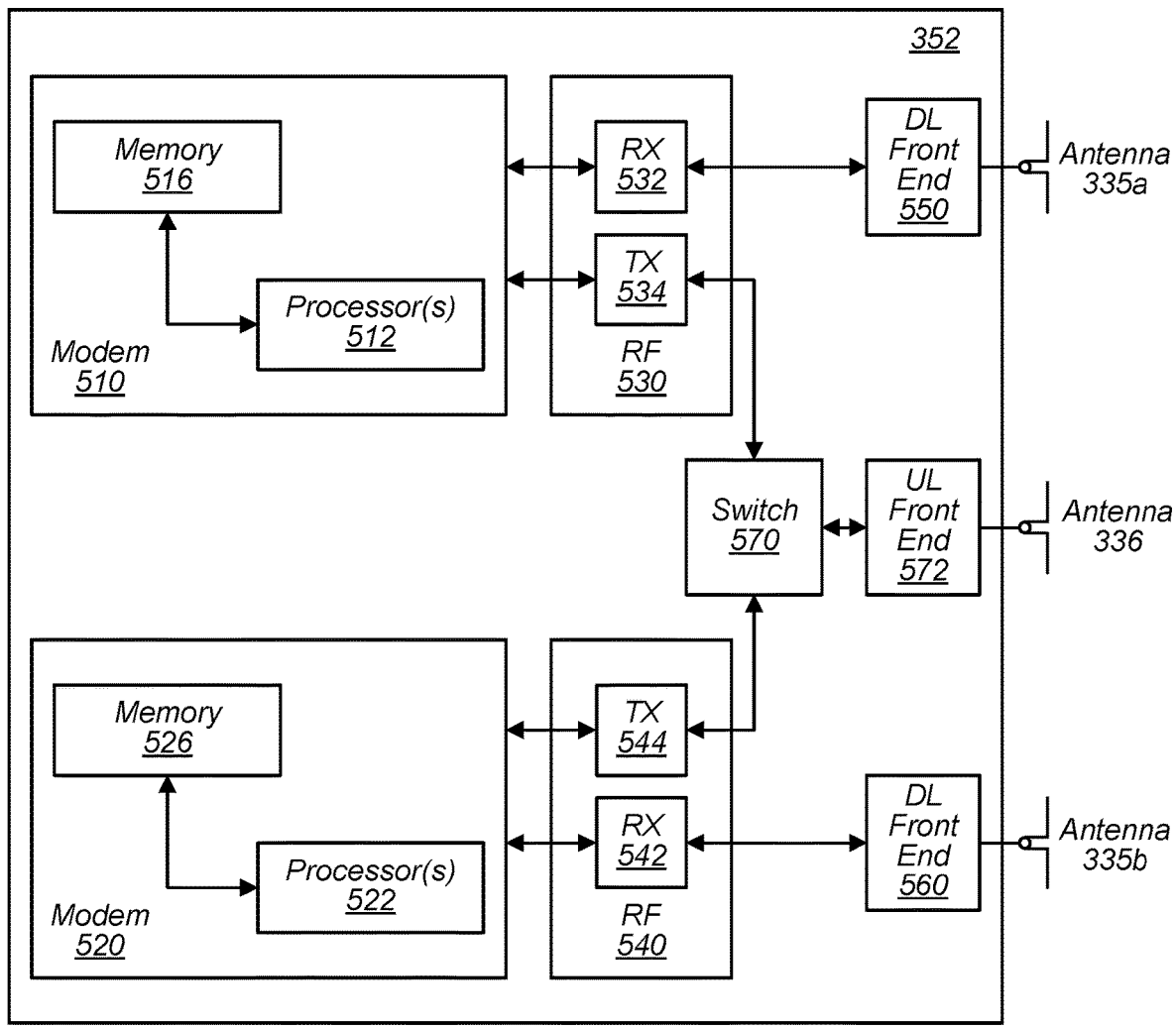
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
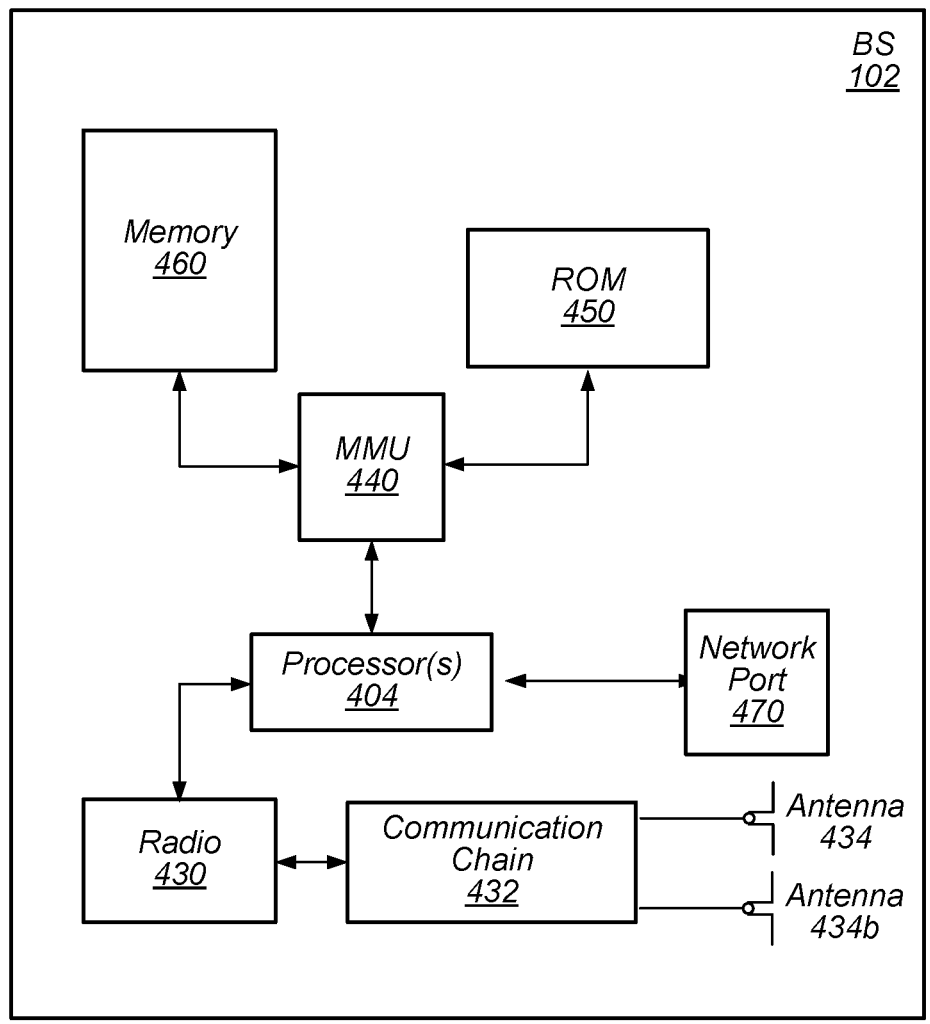
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may perform groupcast transmission with feedback for intra-platooning and inter-platooning communications, e.g. V2X (vehicle-to-everything) wireless cellular communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices that perform groupcast transmission with feedback for intra-platooning and inter-platooning communications, e.g. V2X (vehicle-to-everything) wireless cellular communications, as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
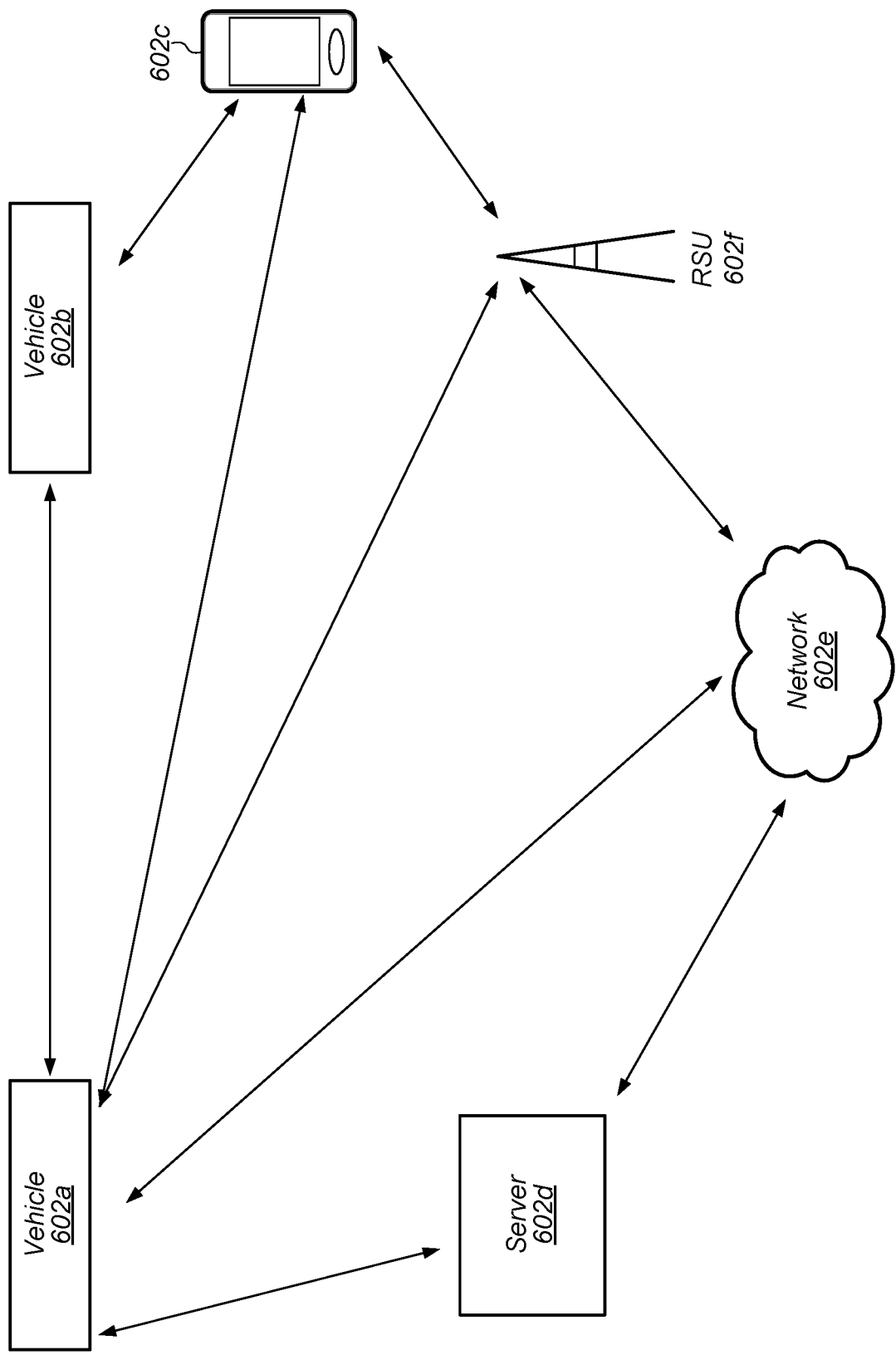
FIG. 6 shows an example of vehicle-to-everything network.

FIG. 6—Exemplary Vehicle-to-Everything Communications Network

FIG. 6 illustrates an exemplary vehicle-to-everything (V2X) communications network, (e.g., as may be specified by 3GPP TS 22.185 V 14.3.0), which allows for communication between a vehicle (e.g., a mobile unit within a vehicle, such as a wireless device incorporated into the vehicle or currently contained within the vehicle and/or another transmitter contained in or otherwise incorporated within the vehicle) and other vehicles and/or various wireless devices. In general, V2X communication systems are considered networks in which vehicles, UEs, and other network entities exchange communications in order to coordinate traffic activity, among other possible purposes. V2X communications include communications conveyed between a vehicle (e.g., a wireless device or communication device constituting part of the vehicle, or contained in or otherwise born along by the vehicle) and various other devices. V2X communications may include vehicle-to-pedestrian (V2P), vehicle-to-infrastructure (V2I), vehicle-to-network (V2N), and vehicle-to-vehicle (V2V) communications, as well as communications between vehicles and other possible network entities and/or devices. V2X communications may also include communications between UEs and/or other devices for the purpose of sharing V2X information.

As mentioned above, V2X communications may, for example, adhere to 3GPP specifications, and they may also adhere to other subsequent or similar standards whereby vehicles and other network entities may communicate. For example, as illustrated in FIG. 6, a vehicle, such as vehicle 602a may be in communication with various devices (e.g., devices 602b-602f), such as road side units (RSUs) exemplified by 602f, infrastructure (V2I) exemplified by 602d, network (V2N) exemplified by 602e, pedestrian (V2P) exemplified by 602c, and/or other vehicles (V2V) exemplified by 602b. In addition, as shown, all devices within the V2X framework may communicate with other devices. V2X communications may utilize both long range (e.g., cellular) communications as well as short- to medium-range communications (e.g., non-cellular) communications. Cellular-capable V2X communications may be called cellular V2X (C-V2X) communications. C-V2X systems may use various cellular radio access technologies (RATs), such as LTE and/or 5G-NR. In at least some embodiments, at least some cellular communications as well as non-cellular communications may use unlicensed bands as well as a dedicated spectrum at a specified frequency, for example 5.9 GHz. Moreover, V2X communications may include unicast, multicast, and/or broadcast communications.

As noted above, there may be many types of devices participating in a V2X communications system. A V2X system may include vehicles, cellular base stations, roadside units (RSUs), and mobile or portable UE devices that may be carried or worn by pedestrians, i.e., pedestrian UEs (PUEs), such as a mobile handset or smartwatch, among other devices. In at least some embodiments of a V2X system, various devices and entities may communicate with other devices or entities (and not necessarily only with vehicles). It should be noted that as used herein, "user devices" or UE may generally refer to devices that are associated with mobile actors or traffic participants of the V2X system, i.e., mobile (able-to-move) communication devices such as vehicles and PUEs. Conversely, "infrastructure devices" may refer to devices in the V2X system which are not traffic actors (i.e., not pedestrians, vehicles, or other users), such as RSUs and base stations.

Sidelink Communications

In wireless communications, specifically cellular wireless communications, sidelink communications represent a special kind of communication mechanism between devices that is not carried through a base station, e.g. it is not carried through eNB/gNB. In other words, the devices communicate with each other without the communication requiring facilitation by a base station. In one sense, the devices may be said to be communicating with each other directly. Accommodation of such communication between devices (or between UEs/PUEs) however requires a new physical layer design, albeit with minimal design changes to existing implementations, in order for new designs not to differ substantially from preexisting designs.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g. to reduce fuel consumption and gas emissions and to achieve safe and efficient transport. To achieve platooning, vehicles in a platoon may use multiple on-board sensors (e.g., radars, lidars—light detection and ranging, positioning systems, etc.) and sidelink vehicle-to-vehicle communications to synchronize their on-road operations, e.g. pertaining to breaking, changing lanes, stopping, etc. Vehicle platooning requires both groupcast transmissions (e.g. for relaying status information for platoon management) and unicast transmissions (e.g. for communication between two members). Efficient intra-platooning communications and inter-platooning communications may help achieve better spectrum/power efficiency while maintaining fair resource competition, e.g. between members of the same platoon and also between different platoons, (consequently, between respective members that are part of different corresponding platoons).

Groupcast Intra-Platooning Transmission with Feedback

Present-day groupcast and broadcast V2X transmissions lack a feedback mechanism and feedback signaling, making it difficult for the transmitting vehicles to effectively communicate with each other. In order to overcome at least this deficiency, in some embodiments, groupcast transmissions used in intra-platoon communications may feature self-contained messages that include feedback information from receivers to transmitters. Within each self-contained channel occupancy time (CoT), both downlink (DL) and uplink (UL) communications may be present, and the format (e.g. which portion of the transmission is DL and which portion of the transmission is UL) may be signaled through control information similar to a physical sidelink control channel (PSCCH). This may be accomplished through a signal referred to as "initial signal" at the onset of establishing communication between the devices (e.g. between the vehicles).

The targeted users for each groupcast message may be signaled in the control information (or initial signal message), also making it possible to transmit sub-group groupcasts, for example. Channel state information reference symbol (CSI-RS) resources associated with the sender and/or receiver may also be added within the same CoT, either through frequency division multiplexing (FDM) or time division multiplexing (TDM), e.g. by appending them at the end of the DL/UL portion of the transmission. For better performance and also to avoid complicated Hybrid Automatic Repeat Request (HARD) retransmission scheduling, each DL message may be transmitted with multiple redundancy versions (RVs) within the same CoT, in a manner similar to transmit time interval (TTI) bundling in LTE or Type_1 Physical Uplink Shared Channel (PUSCH) scheduling in 5G-NR. The number of RVs transmitted for each message in the same CoT may be included in the PSCCH. In other words, the number indicating how many RVs are transmitted for each message within the same CoT may be included in the PSCCH. Previous feedback from receivers (receiving devices/vehicles) may be used by the transmitter (transmitting device/vehicle) to determine how many RVs to use.

Feedback information from receivers (e.g. from receiving vehicles) may be included following DL messages in the self-contained CoT. The feedback information may include acknowledgment/non-acknowledgment (ACK/NACK), information regarding whether certain error checks (e.g. a cyclic redundancy check—CRC) indicate that a packet has been correctly received (possibly also indicating after which RV the error check passes), and may also include a channel quality indicator (CQI) on each CSI-RS resource sent by the transmitter. The feedback information may be prioritized, e.g., ACK/NACK may be part of immediate feedback while CQI may be schedule-based. For different receivers, feedback may be transmitted at the same time using code division multiplexing (CDM).

Figure 7:
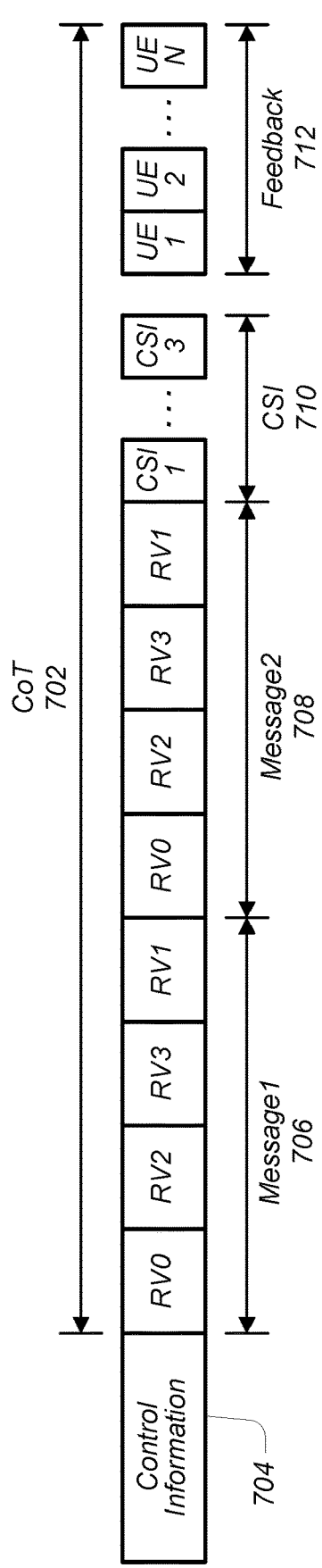
FIG. 7 shows an exemplary message structure that includes feedback information for a groupcast intra-platooning transmission, according to some embodiments.

The above are at least partially illustrated in FIG. 7, which shows an exemplary message structure for messages that may include feedback information for groupcast intra-platooning transmissions (transmissions among members of a platoon, or transmissions internal to a platoon), according to some embodiments. As shown in FIG. 7, feedback information may be included during communications taking place within the channel occupancy time (CoT) 702. It should be noted that CoT refers to the time period, or time duration for which a channel may be occupied once a transmit opportunity is taken. To put it another way, the CoT represent the time duration for which a transmission may occupy a given channel, for example a frequency channel or channel of specific frequency. Thus, as shown in FIG. 7, following the transmitted control information 704 (e.g. in PSCCH), four RVs (RV0-RV3) may be transmitted in each message, e.g. Message1 706 and Message2 708, followed by CSI 710, and feedback information 712 from a specified number of UEs, e.g. from receiving vehicles included in a platoon.

With feedback information received from other users in the group (e.g. from all other users in the group), the sender may further optimize the groupcast messages that it transmits to the other users in the group. For example, the MCS (modulation and coding scheme)/RV repetition of groupcast messages may be adjusted based on the feedback information. The transmitting UE (vehicle) may further divide users in the group (or platoon) into subgroups for transmission efficiency, and may also isolate users experiencing adverse conditions as candidates for unicast transmissions. In case a retransmission is needed, code block group (CBG) based user/subgroup specific targeted groupcast retransmission may be adopted for spectrum efficiency. It should be noted that TBs (transport blocks) can be split into multiple code blocks (CBs), which may be organized in code block groups (CBGs) which may each include multiple CBs. ACK/NACK may be indicated and the data may be retransmitted in CBG units. The CBG may be indicated in DCI.

Each UE (e.g. each vehicle) may also pull information from other UEs (e.g. from other vehicles) by adjusting the UL/DL format within the self-contained CoT. For example, one UE may use groupcast messages to request a channel quality indicator (CQI) report and/or measurement report on the physical layer. Furthermore, the UE may also request information pertaining to other considerations that may not necessarily be related to channel quality and/or channel measurements, but may be related to other operational considerations. For example, one UE (or vehicle) may query other UEs in the group (or platoon) whether a potential lane change, e.g. a lane change to the right, is feasible for each UE in the group, in order to make a decision regarding (or pertaining to) changing lanes. This provides a mechanism for quick turn-around time for time sensitive message passing between UEs, e.g. member UEs in a group, such as vehicles in a platoon. This improves the communication (transmissions) from the other UEs in the group (e.g. the other vehicles in the platoon) for more effective group operation and synchronization.

Figure 8:
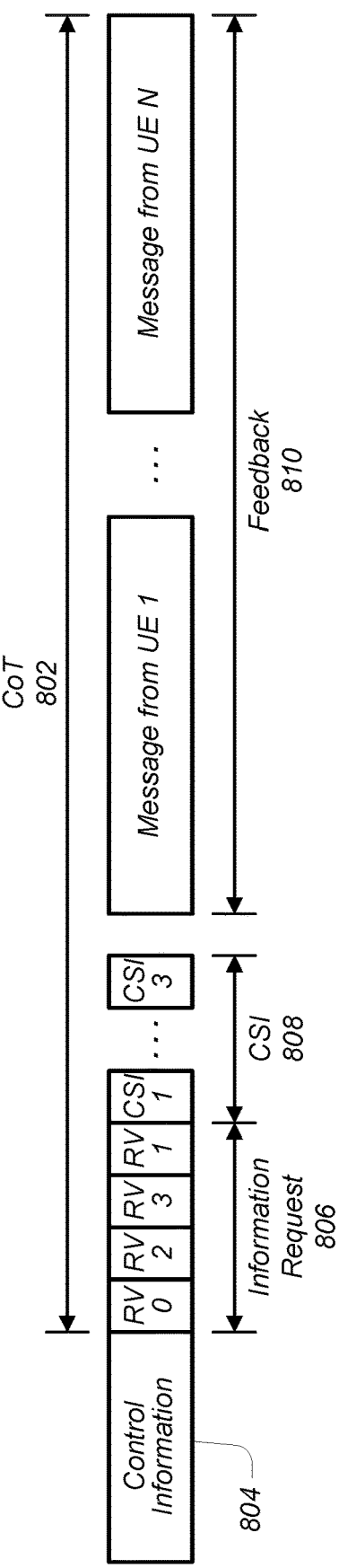
FIG. 8 shows an exemplary message structure that includes an information request and corresponding feedback information for a groupcast intra-platooning transmission, according to some embodiments.

If a Uu interface (e.g. an interface traditionally used for establishing communication between the UE and a base station such as eNB and/or gNB) is available for all users in the group, a group-common (GC-) PDCCH may be used to assign resources. In such cases, UEs may transmit feedback to the NW on the Uu interface to indicate whether the UEs are part of the same group, or more generally, to indicate which group the UE belongs to. This is at least partially illustrated in FIG. 8, which shows an exemplary message structure for a message that includes an information request and corresponding feedback information for a groupcast intra-platooning transmission, according to some embodiments. As shown in FIG. 8, following the transmitted control information 804 (e.g. in PSCCH), during CoT 802 the four RVs (RV0-RV3) may be transmitted in an information request 806, followed by CSI 808, and individual messages transmitted back to the originally transmitting UE as feedback information 810 from a specified number of UEs, e.g. from receiving vehicles included in a platoon. Thus, the feedback information in this instance includes messages sent in response to the information request received by the other UEs, all within the same CoT 802.

Platoon V2X Transmission with Group Leader Design

In some embodiments, platoon communications may be implemented with a designated group leader. A group leader may be selected in the platoon for central control, message broadcast, and also resource assignment. A group leader may assign UEs to compete for the resources representing the group (for inter-group resource competition). For the CoT available for the group, a group leader may further divide the CoT into smaller individual time periods for each UE to transmit its own groupcast messages while the other UEs are listening. In other words, the group leader may designate various portions of the CoT available to the group for groupcast messages to be transmitted by other members of the group. In some embodiments, group leader selection may be performed explicitly when building the group through a user interface (UI). In case a present leader (or most recently designated leader) is no longer considered to be the desired leader among users in the group, e.g., when the radio frequency (RF) conditions between the present group leader and other users in the group would adversely affect the communications within the group, it may be determined that the present group leader is to be replaced or switched to a different member of the group.

Thus, in some embodiments, dynamic group leader selection and/or switching of the group leader may be employed to achieve enhanced spectrum efficiency. Each UE may report to the current group leader information bearing on the selection of a group leader, for example information pertaining to channel quality or other factors determined to be under consideration for group leader selection. Each UE may report to the current group leader various metrics, which may include each given UE transmitting a periodic update that includes the average/outage CQI it receives from other UEs in the group. The average/outage CQI information may be obtained when the given UE receives groupcast messages with CQI feedback from other UEs. The group leader may also schedule a 'measurement' CoT, that is, a CoT during which each UE in the group may receive CSI and measured CQI reported by other UEs. The block error rate (BLER) information may also be used if the given UE has transmitted groupcast messages before. The current leader may determine whether there is a better leader candidate, and assign a new group leader accordingly.

Beamforming for Intra/Inter-Platooning Transmission

Beamforming helps efficient spectrum usage and has been considered for inter-platooning and intra-platooning communications. Intra-platooning or intra-group transmissions may adopt beamforming for groupcast transmissions targeting close located specific users for certain applications. For example, when transmitting groupcast messages targeting users in front of a given UE, beamforming directing to the front may provide better reception for targeted users and reduce interference from other UEs. Inter-platooning or inter-group communications may also use beamforming by certain designated (e.g. preferred) UEs. For example, a front UE, such as a vehicle at the front of a platoon, may transmit the platoon position using specific beamforming directed forward, while a UE, such as a vehicle at the rear of the platoon, may transmit the platoon position by using specific beamforming directed rearward. In some embodiments, a lane changing message may also be transmitted using beamforming by some UEs, such as some vehicles in the platoon.

Figure 9:
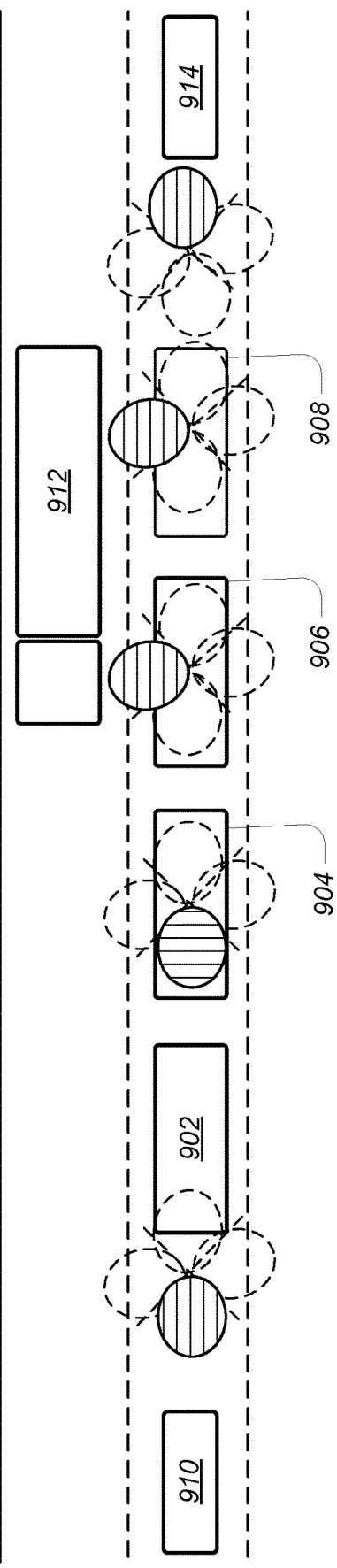
FIG. 9 shows an exemplary diagram illustrating beamforming for inter-platooning and intra-platooning transmissions, according to some embodiments.
Figure 9:

The above concept is at least partially illustrated in FIG. 9, which shows an exemplary diagram illustrating beamforming for inter-platooning and intra-platooning transmissions, according to some embodiments. As seen in FIG. 9, vehicles 902, 904, 906, and 908 form a platoon. Group member 904 may use beamforming for groupcast transmissions targeting vehicle 902 which is at the front of the platoon, to provide better reception for vehicle 902. In a similar manner, vehicle 902 at the front of the platoon may use specific beamforming directed toward vehicle 910 to transmit information to vehicle 910, for example information pertaining to the position of the platoon. Vehicle 908 at the rear of the platoon may do likewise, targeting vehicle 914 traveling just behind the platoon. In addition, vehicles 906 and 908 may use beamforming to signal to vehicle 912, thereby providing better reception for vehicle 912.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device of a group of devices to:
transmit a groupcast message in a sidelink transmission to other devices of the group of devices during a channel occupancy time (CoT), wherein the groupcast message includes a request for one or more devices of the other devices to provide information to the device, wherein the information comprises one or more of an acknowledgment message (ACK), a non-acknowledgment message (NACK), a first indication of whether a packet in the groupcast message has been correctly received, a second indication that indicates a redundancy version after which an error check is successful, or a respective channel quality indicator (CQI), and wherein the redundancy version is one of a plurality of redundancy versions comprised in the packet;
receive the information in respective sidelink transmissions from the one or more other devices during the CoT in response to the request;
determine which of the ACK, the NACK, the first indication, the second indication, and the respective CQI are to be provided in the information and which are scheduled for later inclusion in future information; and
conduct subsequent groupcast transmissions to the other devices based at least on the received information.

2. The apparatus of claim 1,
wherein the processor is configured to cause the device to transmit to the group of devices, prior to receiving the information, one or more of the following:
additional one or more groupcast messages in respective sidelink transmissions; or
control state information.

3. The apparatus of claim 1,
wherein the groupcast message comprises redundancy versions.

4. The apparatus of claim 1,
wherein the processor is configured to cause the device to receive, simultaneously in respective sidelink transmissions from two or more devices of the other devices, respective portions of the information during the CoT.

5. The apparatus of claim 1,
wherein the processor is configured to cause the device to perform one or more of the following in response to the information:
adjust characteristics of future groupcast messages;
divide the group of devices into sub-groups for transmission efficiency;
isolate one or more of the other devices for unicast transmission; or
adjust an uplink/downlink format of future CoTs.

6. The apparatus of claim 1,
wherein the respective CQI is for each channel state information reference symbol transmitted by the device.

7. A device comprising:
radio circuitry configured to facilitate wireless communications of the device with other devices of a group of devices, wherein the group of devices also includes the device; and
a processor communicatively coupled to the radio circuitry and configured to cause the device to:
transmit a groupcast message in a sidelink transmission to the other devices during a channel occupancy time (CoT), wherein the groupcast message includes a request for one or more devices of the other devices to provide information to the device, wherein the information comprises one or more of an acknowledgment message (ACK), a non-acknowledgment message (NACK), a first indication of whether a packet in the groupcast message has been correctly received, a second indication that indicates a redundancy version after which an error check is successful, or a respective channel quality indicator (CQI), and wherein the redundancy version is one of a plurality of redundancy versions comprised in the packet;

receive the information in respective sidelink transmissions from the one or more other devices during the CoT in response to the request;

determine which of the ACK, the NACK, the first indication, the second indication, and the respective CQI are to be provided in the information and which are scheduled for later inclusion in future information; and conduct subsequent groupcast transmissions to the other devices based at least on the received information.

8. The device of claim 7,
wherein the group of devices is a platoon that includes vehicles.

9. The device of claim 7,
wherein the groupcast message includes redundancy versions.

10. The device of claim 7,
wherein the device is designated as a group leader.

11. The device of claim 10,
wherein the processor is configured to cause the device to assign, as the group leader, devices of the other devices to compete for a resource representing the group of devices.

12. The device of claim 10,
wherein the processor is configured to cause the device to divide, as the group leader, a future CoT available for the group into respective time periods for each of the other devices to transmit its own groupcast message, while remaining devices of the group of devices are listening.

13. The device of claim 10,
wherein the processor is configured to cause the device to dynamically designate a new group leader at least in response to radio frequency channel conditions between the device and the other devices not meeting specified requirements.

14. The device of claim 10,
wherein the processor is configured to cause the device to schedule, as the group leader, a future CoT as a measurement CoT during which each device in the group of devices receives channel state information and channel quality information.

15. A non-transitory memory element storing instructions executable by a processor to cause a device of a group of devices to:

transmit a groupcast message in a sidelink transmission to other devices of the group of devices during a channel occupancy time (CoT), wherein the groupcast message includes a request for one or more devices of the other devices to provide information to the device, wherein the information comprises one or more of an acknowledgment message (ACK), a non-acknowledgment message (NACK), a first indication of whether a packet in the groupcast message has been correctly received, a second indication that indicates a redundancy version after which an error check is successful, or a respective channel quality indicator (CQI), and wherein the redundancy version is one of a plurality of redundancy versions comprised in the packet;

receive the information in respective sidelink transmissions from the one or more other devices during the CoT in response to the request;

determine which of the ACK, the NACK, the first indication, the second indication, and the respective CQI are to be provided in the information and which are scheduled for later inclusion in future information; and conduct subsequent groupcast transmissions to the other devices based at least on the received information.

16. The non-transitory memory element of claim 15,
wherein the instructions are executable by the processor to cause the device to transmit to the group of devices, prior to receiving the information, one or more of the following:

additional one or more groupcast messages in respective sidelink transmissions; or control state information.

17. The non-transitory memory element of claim 15,
wherein the instructions are executable by the processor to cause the device to perform one or more of the following in response to the information:

adjust characteristics of future groupcast messages;

divide the group of devices into sub-groups for transmission efficiency;

isolate one or more of the other devices for unicast transmission; or adjust an uplink/downlink format of future CoTs.

18. The non-transitory memory element of claim 15,
wherein the instructions are executable by the processor to cause the device to:

transmit a second groupcast message in a sidelink transmission to targeted devices of the group of devices; and transmit the second groupcast message using beamforming directed from the device toward a location of the targeted devices.

19. The non-transitory memory element of claim 15,
wherein the instructions are executable by the processor to cause the device to:

transmit a second groupcast message in a sidelink transmission to targeted devices of a second group of devices not included in the first group of devices; and transmit the second groupcast message using beamforming directed from the device toward a location of the targeted devices.

20. The device of claim 7,
wherein the respective CQI is for each channel state information reference symbol transmitted by the device.

* * * * *